Dec. 6, 1960  E. GATEAU ET AL  2,962,787
MACHINE FOR MANUFACTURE OF TUBULAR ELEMENTS
Filed July 2, 1956   2 Sheets-Sheet 1

INVENTORS
EUGENE GATEAU AND
ANDRE MOUSSET
BY *Paul M. Craig, Jr.*
ATTORNEY.

Dec. 6, 1960     E. GATEAU ET AL     2,962,787
MACHINE FOR MANUFACTURE OF TUBULAR ELEMENTS
Filed July 2, 1956     2 Sheets-Sheet 2

INVENTORS
EUGENE GATEAU AND
ANDRE MOUSSET.

BY Paul M. Craig, Jr.
ATTORNEY.

United States Patent Office 2,962,787
Patented Dec. 6, 1960

2,962,787
MACHINE FOR MANUFACTURE OF TUBULAR ELEMENTS

Eugene Gateau, Cerizay, France, and Andre Mousset, 62 Rue Taitbout, Paris, France Filed July 2, 1956, Ser. No. 595,417

Claims priority, application France June 30, 1955

14 Claims. (Cl. 25—30)

The present invention relates to machines for manufacturing by centrifugation tubular elements made of, for example, cement or other material.

The machines of this type, known in the prior art, comprise generally two pairs of parallel pulleys which are connected by drive means such as, for example, drive belts, presenting a certain slackness, and on the upper side of which is placed, essentially horizontally, a cylindrical mold into which is introduced, in its pasty state, the material destined to the manufacture of the tubular element, this mold being entrained by the belts for rotary movement imparted to the pulleys by a motor.

In such types of machines it is necessary, in order to obtain good adherence or driving contact of the mold with the belts, that the sag of the latter be either accentuated so as to assure that the belts are in contact with the mold along a circular sector which is large as possible. However, difficulties as regards entrainment result therefrom as, in particular, the belt becomes too long when the belt runs empty, i.e., when it is no longer subject to the weight of the mold. Besides, the pulleys must be of relatively large diameter.

The present invention has for its object a machine which is not subjected to these inconveniences and disadvantages mentioned hereinabove and which permits the attainment of different combinations of positions of the belts, in order to render them suitable to receive, with optimum operating conditions molds of different diameters and of different weight.

Accordingly, it is an object of the present invention to provide an arrangement for supporting and imparting rotary movement to a mold used in connection with the manufacture of tubular elements by centrifugation which increases the adherence or driving contact between the mold and the drive means formed, for example, by the belts.

Another object of the present invention is to provide an arrangement for a machine of the type described which is more economical and more simple in operation and which results in time saving in the operational steps performed.

Another object of the present invention resides in the provision of a machine for the manufacture of tubular elements by centrifugation in which molds of different size and of different weight may be readily accommodated.

Still another object of the present invention is to provide a machine for the manufacture of tubular elements by means of centrifugation in which the mold is drivingly supported, for example, by belts and in which the criticality as regards slack of the belts is considerably reduced.

Still another object of the present invention resides in the provision of a machine for the manufacture of tubular elements by centrifugation in which the drive means pass over pulleys which may be made of relatively smaller diametric dimension.

Still another object of the present invention resides in the provision of a machine for the manufacture of tubular elements in which the angle between the two drive belts which support the mold may be made more acute and may be rendered adjustable.

A further object of the present invention is to be recognized in the provision of such an arrangement of a machine of the type described hereinabove which renders the operation thereof more easy especially as regards the handling of the mold, which may be readily installed and removed from the machine and which, consequently, may be made smaller, lighter and with lesser cost.

Another object of the present invention is the provision of means for adjusting the pulleys so as to enable the insertion and removal of the mold in an essentially horizontal direction laterally of the machine.

Another object resides in the provision of means for adjusting the tautness of the drive belts.

These and other objects, features and advantages of the present invention will become more obvious from the following description when taken in connection with the accompanying drawing, which shows, for purposes of illustration only, several preferred embodiments in accordance with the present invention and wherein.

The machine in accordance with the present invention is characterized by the fact that it comprises, at each end of the mold, in addition to the usual two pulleys as used in the prior art type of machines, at least one supplementary or auxiliary pulley which is located at a lower level than the two upper pulleys, and to which is applied the driving force of a suitable drive means, such as a variable speed electric motor. Such an arrangement enables the use, at will, of either one drive belt which passes over the ensemble of the three pulleys or of two drive belts which pass respectively over one of the upper pulleys and one of the lower pulleys, the latter being then provided with two grooves. In the latter case, the mold is supported on the two drive belts which cross each other at an angle which depends on the respective distances of the pulleys and which may be adjusted. At any rate, this angle may be considerably more acute than would be possible with the two parts of the upper side of a single belt according to the prior art.

Instead of a single lower pulley, it is also possible in accordance with the present invention to use two pulleys which are interconnected between themselves by an auxiliary drive belt in such a manner as to be driven at the same speed. It is then possible to utilize either one single belt which passes over the four pulleys or two separate belts which pass one over the upper left pulley and the lower right pulley and the other over the upper right pulley and the lower left pulley in such a manner as to cross each other.

The position of the pulleys may be adjustable in order to enable adjustment of the angle at which the belts cross each other. According to one feature of the present invention this adjustment is made in such a manner as to permit, at one extreme or end position thereof to give to the drive belts an angle of zero, i.e., so that the upper sides of the belts are thereby aligned in the same plane which may be horizontal or slightly inclined. This arrangement enables the installation or withdrawal of the mold from the side of the machine by simply permitting them to roll over the belts in the plane thus obtained without the need to lift them whereby substantial economy in time and handling is obtained.

The mechanism for displacing the pulleys, which may be of any suitable construction known in the prior art, is actuated in such a manner as to retain the distance between the pulleys carrying the same belt in such a manner as to thereby maintain the tension of the latter.

The pulleys may be brought back by springs or any other suitable means into the position which corresponds to that in which the belts are disposed in the same plane in such a manner as to permit automatic emplacement and removal of the molds.

Figure 1:
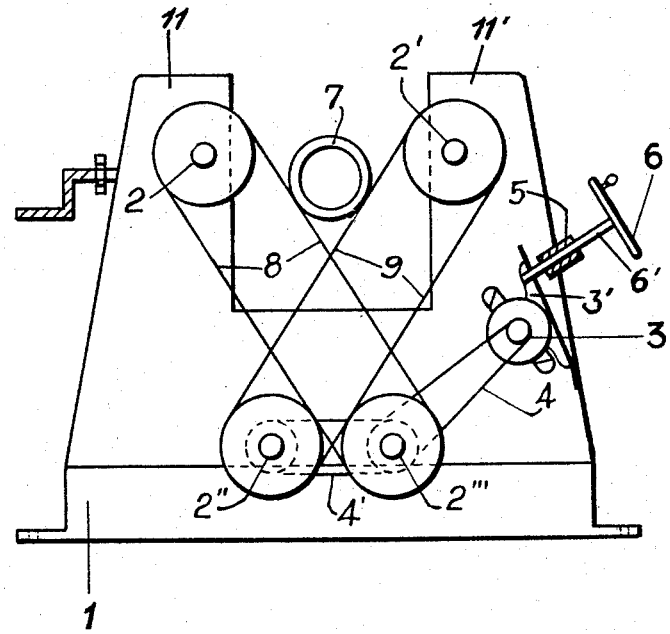
Figure 1 is a schematic view of a preferred embodiment of a machine for the manufacture of tubular elements by centrifugation in accordance with the present invention.

Referring now to the drawing wherein like reference numerals are used throughout the various views to designate like parts, and more particularly to Figure 1, reference numeral 1 designates the frame or bed of the machine having vertically extending frame portions 11 and 11' for supporting upper pulleys. The upper two pulleys are designated by reference numerals 2 and 2' whereas the lower two pulleys are designated by reference numerals 2" and 2'". One of the latter two pulleys, for example, the pulley 2'" is driven by a drive means, such as an auxiliary belt 4, from a motor 3 of any suitable type, preferably of such a type which may be adjusted as to the speed thereof. In order to permit the adjustment of the tension of the auxiliary belt 4 the motor 3 is mounted on a support 3' which is articulately connected to the frame 1 and which may be inclined more or less by means of a threaded shaft 6' which carries a hand wheel 6 at one end thereof and which threadably engages the nut 5 secured in the frame 1.

According to the present invention a single drive belt may be used in connection with the four pulleys 2, 2', 2", 2'", or as indicated in the drawing, a first belt 8 may be used which passes around pulleys 2 and 2'", and a second belt 9 which passes around the pulleys 2' and 2".

The mold 7 is drivingly supported on the upper side of belts 8 and 9 respectively. If pulleys 2 and 2' are each swung essentially about an arc with the centers thereof coinciding with the axes of pulleys 2'" and 2" respectively, then the upper sides of the belts 8 and 9 may be disposed in essentially a single plane, either horizontal or slightly inclined, to facilitate emplacement or removal of the mold 7 which may simply roll along the upper sides of belts 8 and 9.

The movement of the pulleys 2 and 2', or of the two pulleys 2" and 2'", or yet the combined movements of pulleys 2, 2', 2" and 2'" may be accomplished in any suitable manner as long as the distance between pulleys 2 and 2'" and between pulleys 2' and 2" is maintained essentially constant. Such movement may be accomplished, for example, by movement of appropriate frame parts supporting the shafts on which the pulleys are mounted. In the alternative, such movement may be obtained by suitable guide means supporting and guiding the shafts of the pulleys. Of course, any other suitable arrangement may be used to achieve the same desired results.

The machine according to the present invention offers additionally the advantage that the motor is located in a lower part of the machine and to the side thereof, and, therefore, does not impede the installation and removal of the molds.

Figure 2:
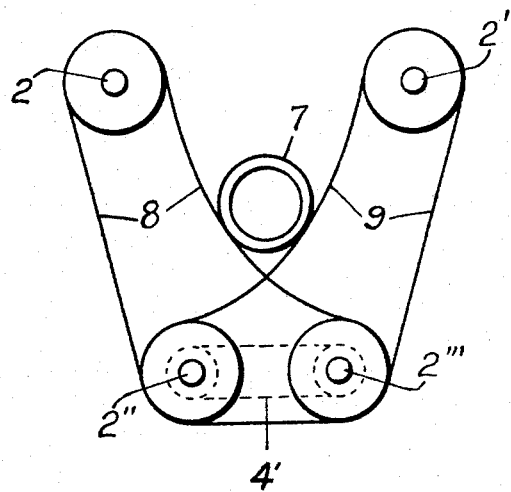
Figure 2 is a different embodiment of a machine of the type described in accordance with the present invention.

According to the modification illlustrated in Figure 2 in which certain parts of the machine illustrated in Figure 1 have been omitted for clarity's sake, the upper side of one of the drive belts such as drive belt 8 connects directly as in Figure 1, the upper left pulley 2 with the lower right pulley 2'". However, the lower side of the drive belt 8 also passes around the left lower pulley 2". Similarly, the belt 9 which connects the pulleys 2' and 2" passes with the lower side thereof underneath the pulley 2'".

Thus, the lower side of each of the two belts 8 and 9 passes under the two driven pulleys 2" and 2'" instead of under only a single one as illustrated in the embodiments according to Figure 1. As a result thereof the adherence of the belts 8 and 9 on the motor-driven pulleys 2" and 2'" is greatly augmented and, consequently, the upper side of the belts 8 and 9 may be left very slack in such a manner that the figure formed by the two belts 8 and 9 approaches rather a U-shape than a V-shape and that the arc along which the mold is embraced by the upper sides of the belts 8 and 9 is increased very considerably whereby the adherence or driving contact therebetween is greatly improved.

Figure 3:
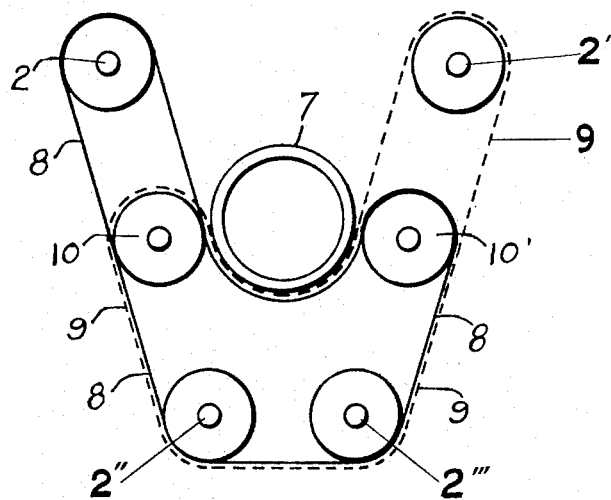
Figure 3 is still another embodiment of a machine of the type described in accordance with the present invention.

According to the modifications illustrated in Figure 3, the machine comprises two intermediate pulleys 10 and 10' which are disposed on each side of the mold 7. The drive belts 8 and 9 are then mounted in the following manner:

The drive belt 8 passes around the upper left pulley 2, then along both sides of the intermediate pulley 10 without enrolling thereon, then with the lower side thereof over the two driven pulleys 2" and 2'" and finally passes around the intermediate right pulley 10' along which it rolls off back upon itself. By the same token, the drive belt 9 passes around the upper right pulley 2', then passes over both sides of the intermediate right pulley 10' without enrolling thereon, then with the lower side thereof over the two driven pulleys 2'" and 2", and finally passes around the intermediate left pulley 10 along which it rolls off back upon itself. Thus, between the pulley 2 and the pulley 10' and between the pulley 2' and the pulley 10, there are two belt portions each engaging opposite sides of the mold below the horizontal axial plane for rotatably supporting it. The mold 7 is thus supported by two belts 8 and 9 along an arc which may attain essentially 180 degrees. In order to enable a clear visual distinction between the two drive belts 8 and 9 in this figure, the belt 8 is shown in full line while the other belt 9 is shown in dashed lines.

Figure 4:
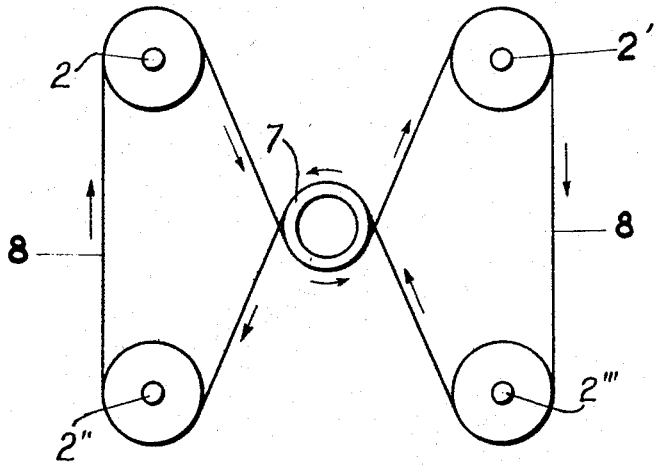
Figure 4 is still a further embodiment of a machine of the type described in accordance with the present invention.

According to the embodiment illustrated in Figure 4 the machine comprises four pulleys 2, 2', 2" and 2'" over which passes a single belt 8. As in the previously-described embodiments, the axes of these four pulleys define the corners of a quadrilateral, within which, portions of the belt cross to support the cylindrical mold and rotate the latter in a position near the center of the quadrilateral. The side of the belt 8 which comes from the two upper pulleys 2 and 2' passes underneath the mold 7 while the side of the belt which comes from the two lower pulleys 2" and 2'" passes above the mold 7. In this manner, as illustrated in Figure 4, the mold 7 is surrounded by the drive belt over almost its entire periphery and is consequently supported and driven essentially in a perfect manner. The mold, therefore, can no longer leave the drive belt 8 since it is supported by the two sides thereof along two diametrically opposed directions and since any movement which might possibly produce itself in one direction would find itself impeded by the pressure of the belt 8 in the other. Consequently, a movement which is perfectly regular may be obtained which renders it possible to utilize a very thin mold, and therewith one which is light, less costly and which can be easily manipulated.

In order to permit the utilization of molds of different diameter with a belt of fixed length and in order to permit the slackening of the sides of the belt to introduce and remove the mold, the machine comprises any suitable means to adjust the tension of the drive belt or belts. Such means may be made in any suitable manner known in the prior art such as, for example, by means of an adjustable auxiliary pulley, or as shown, for example, in Figure 1, in connection with auxiliary belt 4.

While in the drawing the two belts or belt portions appear to intersect each other, it is understood that in reality the two intersecting sides of the belt or the two belts are not exactly in the same plane but are displaced slightly one with respect to the other. It is also understood that two grooves are provided on those pulleys which are to accommodate two drive belts.

The belts may be made of any suitable material such as leather, rubber, fabric, plastic material, metallic chains or any combination of these materials which are suitable. The belts or drive means may be of any suitable size and may even be reduced to simple cables.

Furthermore, for sake of clarity, elements 1, 3, 3', 4, 5, 6, 6', 11 and 11' have not been shown in Figures 2 to 4. However, it is understood that such elements may be provided in these claims.

In Figures 1 and 2, reference numeral 4' designates the additional auxiliary belt used to drivingly connect the two pulleys 2'' and 2''' with each other.

While we have shown and described several preferred embodiments in accordance with the present invention, the same is not limited thereto but is susceptible of many changes and modifications within the spirit of the present invention, and we intend to cover all such changes and modifications except as limited by the appended claims.

We claim:

1. A machine for the manufacture of tubular elements by centrifugation comprising a plurality of upper and lower pulleys, means for driving at least one of said pulleys, belt means consisting of at least one belt drivingly connecting said pulleys, at least two sides of said belt means crossing each other in an area generally centrally of the area between the upper and lower pulleys to form an essentially acute angle thereby, and a mold placed into the upper part of said acute angle between said two sides and drivingly supported thereby.

2. A machine as defined in claim 1 including two upper pulleys and one lower pulley provided with two grooves, and wherein said belt means consists of two belts mounted on said pulleys with each belt defining a respective one of said two sides which cross each other so as to form essentially a V defining said acute angle.

3. A machine as defined in claim 1 including two upper pulleys and two lower pulleys, and wherein said belt means consists of two belts mounted on said pulleys with each belt defining a respective one of said two sides which cross each other so as to form essentially an X defining said acute angle between the upper two extremities of the X.

4. A machine according to claim 1 comprising two lower pulleys, and means for connecting said two lower pulleys to assure equal rotary speed thereof.

5. A machine according to claim 1 wherein there are two lower pulleys and further comprising two intermediate pulleys disposed on both sides of said mold, said belt means consisting of two belts each engaging said mold with a portion extending between one of the upper pulleys and the intermediate pulley at the opposite side of the machine, one of said belts passing around the upper pulley on one side of the machine, thereupon with one side thereof underneath the two lower pulleys and about the intermediate pulley on the other side of the machine, and the other belt passing over the upper pulley on the other side, with the lower side thereof underneath both lower pulleys and around the intermediate pulley on said one side.

6. A machine according to claim 1, further comprising means for regulating the position of at least one of said pulleys so as to change the angle formed by the intersection of said belt means.

7. A machine according to claim 1 wherein said driving means is located in the lower part and to one side of the machine so as to avoid impairment thereby during emplacement and removal of the mold.

8. A machine for the manufacture of tubular elements by centrifugation comprising two upper and two lower pulleys, means for driving at least one of said pulleys, belt means drivingly connecting the upper pulleys with the lower pulleys, at least two upper sides of said belt means crossing each other in an area generally centrally of the area between the upper and lower pulleys, a mold drivingly supported by said two upper sides, and means for adjusting the position of at least two of said pulleys to bring said two sides into essentially the same plane so as to facilitate installations and removal of the mold.

9. A machine for the manufacture of a tubular element in a mold by centrifugation, the axis of rotation of said mold being disposed in an essentially vertical plane, comprising a plurality of pulleys including upper and lower pulleys, at least one upper and one lower pulley disposed on each side of said essentially vertical plane, means for driving at least one of said pulleys, belt means interconnecting all of said pulleys and including two upper sides each leading from a respective upper pulley downwardly and through said essentially vertical plane to a pulley other than the upper pulley located on the opposite side of said plane and thereby forming support means directly by said upper sides within the region of said plane open from above for said mold, whereby said mold may be placed on said support means from above.

10. A machine according to claim 1, further comprising a motor, and means including an auxiliary belt for driving at least one of said pulleys by said motor, support means for said motor articulately connected to the frame of the machine, and means including a threaded engagement for increasing and decreasing the incline of said support means to thereby regulate the tension of said auxiliary belt.

11. A machine according to claim 3 wherein one of each of said upper and lower pulleys are disposed on one side of a vertical plane including a central axis of said mold, the other upper and lower pulleys being disposed on the opposite side of said plane, one of said belts passing around one of the upper pulleys and both lower pulleys, the other belt passing around the other upper pulley and both lower pulleys, said belts crossing at said central plane to form said X.

12. A machine for the manufacture of tubular elements by centrifugation in a cylindrical mold, comprising two upper and two lower pulleys, the axes of which define the corners of a quadrilateral as seen from one end of the machine and a belt means connecting all four pulleys and including two portions extending across a central area of the quadrilateral, said two portions following different paths as seen from said one end of the machine and constituting means for supporting and rotating said cylindrical mold, said lower pulleys being so located relative said upper pulleys and guiding said belt means to act on said mold to substantially prevent lateral movement of said cylindrical mold during rotation thereof.

13. A machine for the manufacture of tubular elements by centrifugation in a cylindrical mold, comprising a plurality of upper and lower pulleys, belt means connecting said pulleys and supporting said mold for rotation about a substantially horizontal axis, and means for driving said belt means to rotate said mold about said axis, said belt means comprising two separate belt portions of which one portion extends between two upper and lower pulleys from an upper point on one side of said axis to a lower point on the other side of said axis and the other belt portion extends between two upper and lower pulleys from an upper point on said other side of the axis to a lower point on said one side of said axis, said belt portions respectively engaging opposite sides of said mold below the horizontal axial plane of the latter for rotatably supporting the mold.

14. A machine according to claim 1, comprising two upper pulleys and further including means for regulating the position of said two upper pulleys so as to dispose the upper sides of said belt means essentially in the same plane to thereby permit emplacement and removal of the mold from the side of the machine.

References Cited in the file of this patent

UNITED STATES PATENTS

| | | |
|---|---|---|
| 1,837,324 | Hume | Dec. 22, 1931 |
| 2,042,395 | Halkyard | May 26, 1936 |
| 2,491,890 | Butler | Dec. 20, 1949 |
| 2,589,950 | Medina | Mar. 18, 1950 |

FOREIGN PATENTS

| | | |
|---|---|---|
| 140,651 | Austria | Feb. 25, 1935 |
| 736,185 | France | Sept. 12, 1932 |